(No Model.) 2 Sheets—Sheet 1.

A. MILLER.
MANURE SPREADER.

No. 359,737. Patented Mar. 22, 1887.

WITNESSES
John E. Wiles.
N. S. Wright

INVENTOR
Abraham Miller
By W. W. Jeggett
Attorney (No Model.) 2 Sheets—Sheet 2.
A. MILLER.
MANURE SPREADER.
No. 359,737. Patented Mar. 22, 1887.
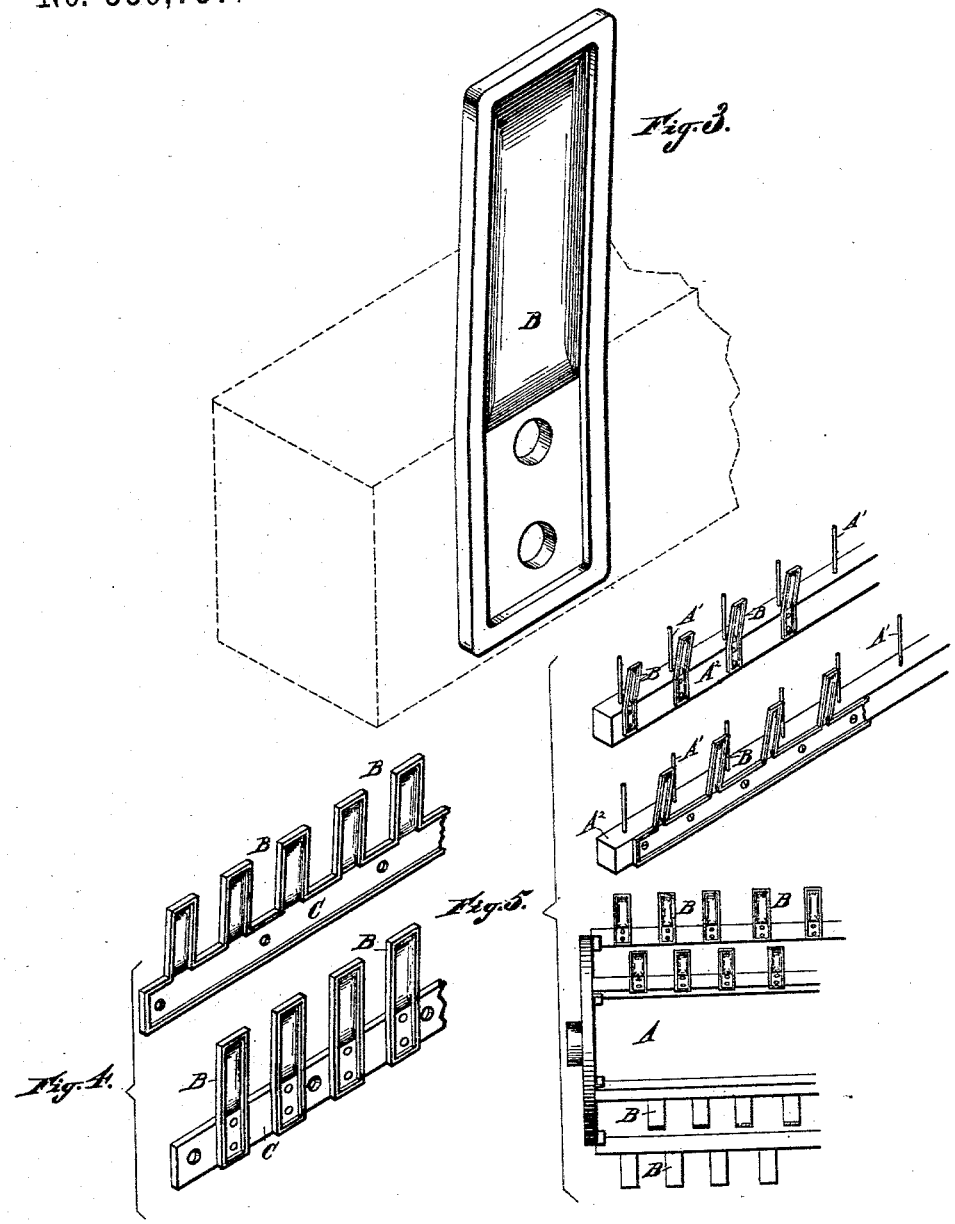
WITNESSES
John E. Wiles
N. S. Wright
INVENTOR
Abraham Miller
By C. V. C. V. Leggett
Attorney

United States Patent Office.

ABRAHAM MILLER, OF NEWARK, ASSIGNOR TO THE NEWARK MACHINE COMPANY, OF COLUMBUS, OHIO.

MANURE-SPREADER.

SPECIFICATION forming part of Letters Patent No. 359,737, dated March 22, 1887.

Application filed January 24, 1887. Serial No. 225,346. (No model.)

*To all whom it may concern:*

Be it known that I, ABRAHAM MILLER, of Newark, county of Licking, State of Ohio, have invented a new and useful Improvement in Manure-Spreaders; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

Figure 1:
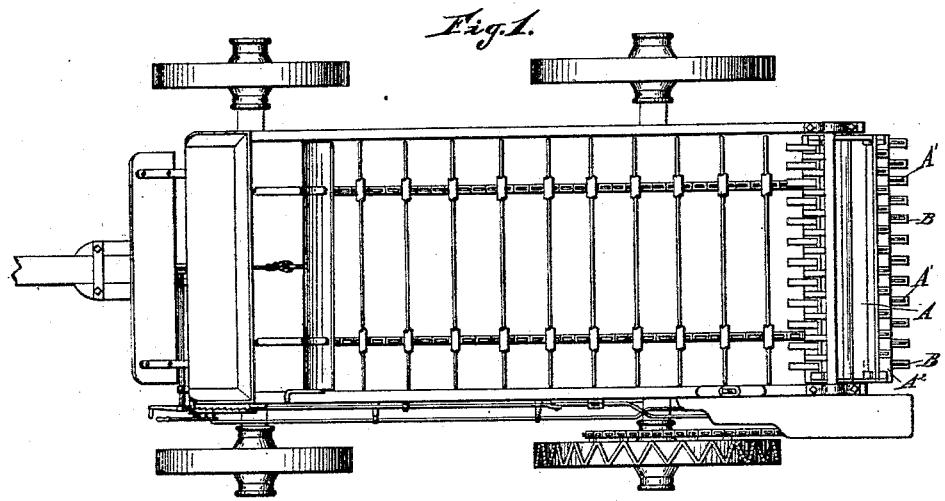
Figure 2:
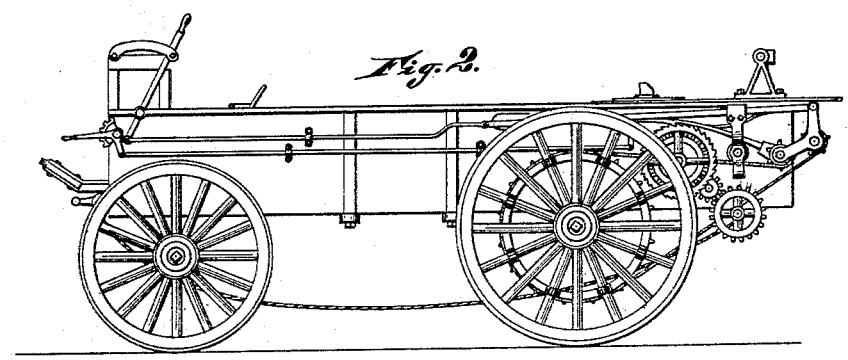

In the drawings, Figure 1 is a plan view, and Fig. 2 a side elevation, of a manure-spreader embodying my invention. Fig. 3 is a separate view of one of my spoon-teeth adapted for independent attachment to the lags of the distributing-cylinder; Fig. 4, a separate view of a series of spoon-teeth made in a single piece with or attached to a bar, said bars adapted for attachment to the lags of the distributing-cylinder. Fig. 5 is an enlarged view showing the relation the spoons may have to the regular manure-teeth.

It is the purpose of my invention to provide the distributing-cylinder of any manure-spreader of that class which employ distributing-cylinders with means whereby a machine such as is ordinarily employed for spreading heavy manures—such as ordinary barn-yard manure—may be quickly adapted for the spreading of lime, guano, phosphates, and other light fertilizers of that character, and I accomplish the same by providing removable spoon-teeth, which may be temporarily employed upon the lags of the cylinders, either in front of or breaking spaces with the ordinary teeth upon the cylinder.

I would have it understood at the outset that while my device is shown as applied to a particular form of manure-spreader which I have been engaged in manufacturing, yet it is in no way limited to any particular construction, but is equally applicable to any of that class of manure-spreaders which employ distributing-cylinders.

In carrying out my invention, A represents the distributing-cylinder of a manure-spreader, to which cylinder motion is communicated in any convenient manner as the manure is fed to the discharge end of the machine.

A' are the ordinary teeth, such as are employed for spreading ordinary heavy or coarse manures.

B represents my spoon-teeth, which I apply to the lags A² of the cylinders. These spoon-teeth are broad and preferably hollowed or concaved on their advanced faces, so that as the light manures—such as lime, guano, phosphates, and the like—are discharged from the wagon these spoons will catch up a quantity and throw it off upon the ground. These spoons may be made to take the place of the teeth on the lags A² if the said ordinary teeth are readily removable; but I prefer, when it is desired to operate with light manures, simply to put upon the lags a set of my spoon-teeth without disturbing the ordinary teeth in any way. They may be placed so as to be right in front of the ordinary teeth, or they may be placed so as to break spaces with the ordinary teeth, both forms being shown in Fig. 5. So, also, instead of fastening each spoon individually to the lags, they may be grouped together and attached to a bar, C, and the bars be fastened to the lags; or the spoon-teeth may be made in a single piece with the bar C, and of malleable, cast, or wrought metal.

The shape of the spoon may be varied without departing from my invention, and, if desired, they may break joints in successive rows, so as to leave no vacant spaces in use between them, through which the fertilizer could fall to the ground, and that is the way I have employed them.

Of course the spoon-teeth might remain in place; but I prefer that they shall be removable, for their presence with ordinary manures would frequently prove a disadvantage.

What I claim is—

1. In a spreader, the combination, with its distributing-cylinder, of spoon-shaped teeth, whereby it is adapted for use with light manures, substantially as described.

2. In a manure-spreader, the combination, with its distributing-cylinder, in addition to the ordinary teeth, of spoon-teeth, whereby it is adapted to operate upon light manures, substantially as described.

3. In a manure-spreader, the combination, with its distributing-cylinder, of spoon-teeth arranged in advance of its ordinary teeth on each lag, substantially as described, whereby it is adapted to operate upon light manures.

4. In a manure-spreader, the combination, with its distributing-cylinder, in addition to its ordinary teeth, of spoon-teeth arranged in groups upon separate plates and the latter removably attached to the lags of the cylinder, substantially as described.

5. The spoon-tooth hollowed or concaved upon its face and adapted for attachment to a lag of the distributing-cylinder of a manure-spreader, substantially as described.

6. A bar provided with a series of spoon-teeth made integral therewith or attached thereto, said bar adapted for attachment to a lag of the distributing-cylinder of a manure-spreader, substantially as described.

In testimony whereof I sign this specification in the presence of two witnesses.

ABRAHAM MILLER.

Witnesses:
RICHD. T. CLARKE,
H. B. WHITE.